United States Patent
Ishikawa et al.

(10) Patent No.: US 6,669,852 B2
(45) Date of Patent: Dec. 30, 2003

(54) SEPARATION METHOD OF GOETHITE-CONTAINING RED MUD

(75) Inventors: Isao Ishikawa, Kanagawa (JP); Haruo Washikita, Kanagawa (JP); Yasuo Kawai, Kanagawa (JP); Koyuki Mesuda, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 77 days.

(21) Appl. No.: 09/984,452

(22) Filed: Oct. 30, 2001

(65) Prior Publication Data

US 2002/0096476 A1 Jul. 25, 2002

Related U.S. Application Data

(60) Provisional application No. 60/270,142, filed on Feb. 22, 2001.

(30) Foreign Application Priority Data

Oct. 30, 2000 (JP) ..................................... P2000-330037

(51) Int. Cl.[7] ................................................. B01D 21/01
(52) U.S. Cl. ........................ 210/734; 423/121; 423/122; 210/733
(58) Field of Search ................................ 210/725, 727, 210/728, 733, 734; 423/121, 122

(56) References Cited

U.S. PATENT DOCUMENTS

| 4,767,540 A | * | 8/1988 | Spitzer et al. ............... 210/728 |
| 5,847,056 A | | 12/1998 | Rothenberg et al. |
| 5,853,677 A | | 12/1998 | Avotins et al. |
| 6,036,869 A | * | 3/2000 | Selvarajan et al. ......... 210/733 |

FOREIGN PATENT DOCUMENTS

| EP | 0 686 599 A1 | 12/1995 |
| JP | 50-96460 A | 7/1975 |

OTHER PUBLICATIONS

International Search Report.

S.E. Sankey, et al, "The Use of Synthetic Flocculant Polymers In Settling Red Muds Derived From High Geothite Bauxite Ores", *Light Metals*, 1984, pp. 1653–1667.

D.P. Spitzer, et al, "Development Of New Bayer Process Flocculants", *Light Metals*, 1991, pp. 167–171.

* cited by examiner

*Primary Examiner*—Peter A. Hruskoci
(74) *Attorney, Agent, or Firm*—Sughrue Mion, PLLC

(57) ABSTRACT

In order to provide a method for effectively separating red mud generated during alumina-extraction treatment of an alumina ore containing goethite as an iron component, the alumina ore containing goethite as an iron component is treated with an alkaline solution at 110–160° C., to thereby take up alumina components through extraction, and a settling aid formed of a water-soluble polymer including, as an effective component, a copolymer containing, as a monomer component, a vinylhydroxamic acid compound or a salt thereof (A) and having an average molecular weight of at least 2,000 is added to the resultant extract, to thereby settle the red mud for separation thereof.

3 Claims, No Drawings

US 6,669,852 B2

SEPARATION METHOD OF GOETHITE-CONTAINING RED MUD

CROSS REFERENCE TO RELATED APPLICATION

The present application is filed under 35 U.S.C. §111(a), and claims benefit, pursuant to 35 U.S.C. §119(e)(1), of the filing date of Provisional Application No. 60/270,142 filed Feb. 22, 2001 pursuant to 35 U.S.C. §111(b).

FIELD OF THE INVENTION

The present invention relates to a method for separating an extraction residue (known as red mud) generated from a goethite-containing alumina ore. More particularly, the present invention relates to a method for separating, by use of a settling agent formed of a specific water-soluble copolymer, red mud contained in a sodium aluminate solution yielded through treatment, with an alkaline solution, of an alumina ore containing goethite as an iron component.

BACKGROUND OF THE INVENTION

The Bayer process is generally employed as a method for recovering alumina from an alumina ore through extraction. In a typical manner of the Bayer process, an alkaline solution is mixed with bauxit—named after the place where it was produced—serving as an alumina ore; the mixture is wet-milled, to thereby form a slurry; the slurry is heated at high temperature in order to take up, through extraction, an alumina component contained in bauxite, to thereby obtain an alumina-component-containing extract; and a remaining bauxite residue (i.e., extraction residue, usually called "red mud" because of its red color provided from an iron hydroxide component contained therein)—an undissolved component—is separated from the liquid phase. From the resultant alumina extract (aqueous sodium aluminate solution) from which red mud has been removed, aluminum hydroxide is precipitated, and the precipitated aluminum hydroxide is fired, to thereby yield alumina.

The residue (red mud), which is an undissolved component generated from bauxite, is separated from the slurry for extraction that has been treated at high temperature while the slurry is cooled to about 100° C. under atmospheric pressure. Typically, a thickener equipped with a mud collector is employed as a separation unit. Since the residue has a particle size as small as 10 $\mu$m or less, solid-liquid separation requires a long period of time. Thus, conventionally, a water-soluble polymer flocculant is used in order to accelerate sedimentation of the residue generated from bauxite.

Polymers such as sodium acrylate and a sodium acrylate-acrylamide copolymer are employed as polymer flocculants. In addition, a settling aid such as slaked lime or starch is also used in order to improve the sedimentation rate of the residue and to enhance the level of concentration of the lower liquid of the thickener to solid and clarification of the upper liquid.

However, some of the above substances, such as polymer flocculants, slaked lime, and starch, are not effective for separation of an extraction residue generated from any type of alumina ore. For example, studies have proven that these substances are effective for accelerating sedimentation of red mud generated from bauxite produced from GOVE ore, in Australia, but are not effective for accelerating sedimentation of red mud generated from bauxite occurring in southeast Asia, particularly in Indonesia.

This is because the residue generated from bauxite, predominantly containing components such as iron, silica, aluminum, titanium, and sodium, has a crystal morphology including any of these components that varies in accordance with the type of bauxite, leading to variation in properties such as sedimentation rate, condensation to solid, and clarification.

Examples of compounds having a high sedimentation rate include hematite ($Fe_2O_3$), anatase ($TiO_2$), and boehmite ($\gamma$-AlOOH), and examples of compounds having a low sedimentation rate include goethite (FeO(OH)), sodalite ($Na_4ClSi_3Al_3O_{12}$), rutile ($TiO_2$), and gibbsite ($Al(OH)_3$) (K. Yamada, et al. *Light Metals.,* 1980, p39–50).

Large amounts of alumina ores such as BINTAN ore (Indonesia) are imported to Japan. These alumina ores contain trihydrate (gibbsite) as an alumina component and FeO(OH) (goethite) as an iron component. When such ores are subjected to a typical Bayer process, settling and separating an extraction residue (red mud) by use of a customary flocculent is difficult, since the residue contains goethite having a low sedimentation rate. Thus, there have been proposed a variety of measures for improving the settling characteristic of the extraction residue generated from bauxite containing a large amount of goethite.

Among such measures, Japanese Patent Application Laid-Open (kokai) No. 50-159497 discloses a method of converting goethite contained in bauxite to magnetite ($Fe_3O_4$) through elevation of alumina extraction temperature. This method includes extraction of alumina under the conditions; i.e., in the presence of a reducing organic substance at an extraction temperature of 270° C. or higher, to thereby convert goethite to magnetite having a good sedimentation property, thus leading to improvement in sedimentation characteristics. However, the method is economically disadvantageous, because of high energy consumption and requirement of expensive apparatus and material.

Japanese Patent Publication (kokoku) Nos. 54-3838 and 58-42131 disclose extraction methods including combined use of a substance of good sedimentation property. According to these methods, a substance of good sedimentation property is added with stirring to the extraction system, to thereby alter compositional proportions of the residue, thus attaining favorable separation of a substance of poor sedimentation property. However, these methods are also economically disadvantageous, because of a requirement for constant storage of a compound of good sedimentation property, thereby complicating the process.

Japanese Patent Application Laid-Open (kokai) No. 56-92116 discloses use of a settling aid formed of starch which has been cationized to the form of quaternary ammonium. By use of this settling aid in separation of red mud generated from a goethite-containing alumina ore, the sedimentation property can be slightly improved. However, this method is still unsatisfactory for industrial-scale treatment.

As described above, in relation to separation of red mud generated from a goethite-containing alumina ore, particularly that produced in Indonesia, the ore being imported to Japan in a large amount, there has never been known a settling aid which is endowed with good settling-separation characteristics and economical advantage and attains satisfactory performance in practical use during single use thereof.

SUMMARY OF THE INVENTION

The present inventors have conducted extensive studies to solve the aforementioned problems, and have found that separation of red mud generated upon treatment of an alumna ore containing goethite as an iron component can be performed very rapidly through use, as a flocculant (settling aid), of a water-soluble polymer including, as an effective component, a copolymer containing a divalent moiety formed of a vinylhydroxamic acid compound or a salt thereof and having an average molecular weight of at least 2,000. The present invention has been accomplished on the basis of this finding.

The water-soluble polymer to be used in the present invention, containing a vinylhydroxamic acid moiety or a salt thereof as a recurring monomer component, is disclosed to be usable as a settling aid for treatment of an alumna ore (U.S. Pat. No. 4,767,540). However, this patent provides no description about effectiveness of the settling agent for separation of red mud upon treatment of an alumina ore containing goethite as an iron component. Therefore, those skilled in the art cannot easily conceive, on the basis of the description of U.S. Pat. No. 4,767,540, the present invention directed to separation of goethite-containing red mud.

Accordingly, the present invention provides the below-defined methods for separating goethite-containing red mud.

1) A method for separating goethite-containing red mud contained in a sodium aluminate solution which is obtained by heating an alumina ore containing goethite as an iron component with an alkaline solution at 110–160° C., which method comprises adding a settling aid formed of a water-soluble polymer including, as an effective component, a copolymer containing, as a monomer component, a vinylhydroxamic acid compound or a salt thereof (A) and having an average molecular weight of at least 2,000, to thereby settle the red mud and separate the settled mud.

2) A method for separating goethite-containing red mud as described in 1), wherein the copolymer having an average molecular weight of at least 2,000 contains, as monomer components, a divalent moiety of a vinylhydroxamic acid compound or a salt thereof (A); and a divalent moiety of at least one monomer selected from among (meth)acrylic acid or a salt thereof (B); (meth)acrylamide (C); and an N-vinylcarboxamide compound (D).

3) A method for separating goethite-containing red mud as described in 1), wherein the copolymer having an average molecular weight of at least 2,000 contains, as monomer components, a divalent moiety of a vinylhydroxamic acid compound or a salt thereof (A); a divalent moiety (meth)acrylic acid or a salt thereof (B); and a divalent moiety of (meth)acrylamide (C).

4) A method for separating goethite-containing red mud as described in 1), wherein the alumina ore comprises the iron component containing goethite in an amount of at least 60 mass %, and the alumina component containing gibbsite in an amount of at least 70% is used as a raw material.

5) A method for separating goethite-containing red mud as described in 1), wherein the settling aid formed of the water-soluble polymer contains, in an amount of at least 20 mass %, the copolymer containing, as a monomer component, a divalent moiety formed of a vinylhydroxamic acid compound or a salt thereof (A).

6) A method for separating goethite-containing red mud as described in 2), wherein the ratio of the vinylhydroxamic acid compound or a salt thereof serving as monomer component (A) to the total monomer component is at least 5 mol %.

7) A method for separating goethite-containing red mud as described in 2), wherein the water-soluble polymer is added in an amount of 0.003–0.05 mass % on the basis of red mud, as reduced to the total mass of monomer components (A), (B), (C), and (D).

DETAILED DESCRIPTION OF THE INVENTION

The present invention will next be described in more detail.

(1) Alumina Ore

The method for separating red mud generated during treatment of an alumina ore is applied to separation of red mud generated from an alumina ore that has been difficult when a conventional settling aid is employed. The method is effectively applied to an alumina ore which comprises the iron component predominantly containing goethite and the alumina component predominantly containing alumina trihydrate (gibbsite), particularly when applied to an alumina ore which comprises the alumina component containing alumina trihydrate in an amount of at least 70 mass %, and the iron component containing goethite in an amount of at least 60 mass % (as reduced to iron oxide).

Examples of typical alumina ores having such a composition include bauxite produced in southeast Asia; e.g., Indonesia.

The alumina ore to which the present invention can be applied is not limited to that produced in Indonesia, and the amount of gibbsite and amount of goethite in the iron component are not particularly limited to the aforementioned ranges. The invention is also effectively applied to an alumina ore which comprises the alumina component containing gibbsite in an amount less than 70 mass %, and the iron component containing goethite in an amount less than 80 mass % (as reduced to iron oxide).

(2) Alkaline Solution

Examples of the alkaline solution which can be used in the present invention include alkaline solutions for use in the Bayer process. Among them, a sodium aluminate solution is preferred. A sodium aluminate solution having an alkali concentration (as reduced to NaOH) of 100–400 g/L, preferably 120–220 g/L, can be used.

(3) Flocculant (Settling Aid)

The flocculant (settling aid) which is used in the present invention is a water-soluble polymer including, as an effective component, a copolymer containing, as a monomer component, a divalent group of a vinylhydroxamic acid compound or a salt thereof (A) and having an average molecular weight of at least 2,000.

Examples of the vinylhydroxamic acid compound or a salt thereof (A) include monomers represented by the following formula (1):

$$CH_2=C(R^1)CONHOM^1 \qquad (1)$$

(wherein $R^1$ represents a hydrogen atom or a methyl group; and $M^1$ represents a hydrogen atom or an alkali metal atom). Specific examples include vinylhydroxamic acid, isopropenylhydroxamic acid, and an alkali metal salt thereof (sodium salt, potassium salt, etc.), with vinylhydroxamic acid and the sodium salt thereof being preferred.

Examples of the monomers to be copolymerized with monomer component (A) include at least one monomer selected from among (meth)acrylic acid or a salt thereof (B); (meth)acrylamide (C); and an N-vinylcarboxamide compound (D).

Examples of the (meth)acrylic acid or a salt thereof (B) include monomers represented by the following formula (2):

$$CH_2=C(R^2)COOM^2 \qquad (2)$$

(wherein $R^2$ represents a hydrogen atom or a methyl group; and $M^2$ represents a hydrogen atom or an alkali metal atom). Specific examples include acrylic acid, methacrylic acid, and an alkali metal salt thereof (sodium salt, potassium salt, etc.), with acrylic acid and the sodium salt thereof being preferred.

Examples of the (meth)acrylamide (C) include monomers represented by the following formula (3):

$$CH_2=C(R^3)CONH_2 \quad (3)$$

(wherein $R^3$ represents a hydrogen atom or a methyl group), and specific examples include acrylamide and methacrylamide, with acrylamide being preferred.

Examples of the N-vinylcarboxamide compound (D) include monomers represented by the following formula (4):

$$CH_2=CHNR^4COR^5 \quad (4)$$

(wherein $R^4$ and $R^5$ may be identical to or different from each other; each of $R^4$ and $R^5$ represents a hydrogen atom or a methyl group), and specific examples include N-vinylformamide, N-vinylacetamide, N-methyl-N-vinylformamide, and N-methyl-N-vinylacetamide, with N-vinylacetamide being preferred.

In addition to the aforementioned monomers (B), (C), and (D), there can be incorporated an acrylic acid derivative or a vinyl alcohol derivative (E) represented by the following formula (5):

$$CH_2=CR^6X \quad (5)$$

(wherein $R^6$ represents a hydrogen atom or a methyl group; X represents $-CN$, $-COOR^7$, $-CONH_2$, $-CONHR^8$, $-COR^9$, $-OCOR^{10}$, or $-OR^{11}$, where $R^7$ represents a C1–C4 alkyl group, and one hydrogen atom therein may be substituted by $-OH$ or $-NR^{12}R^{13}$; $R^8$ represents a C1–C4 alkyl group and one hydrogen atom therein may be substituted by $-OH$ or $-NR^{12}R^{13}$; and each of $R^9$, $R^{10}$, $R^{11}$, $R^{12}$, $R^{13}$ represents a C1–C4 alkyl group).

As used herein, the C1–C4 alkyl group refers to methyl, ethyl, propyl, butyl, or an isomeric group thereof.

Specific examples of the compounds represented by formula (5) include methyl acrylate, ethyl acrylate, propyl acrylate, 2-hydroxyethyl acrylate, N,N-dimethylaminoethyl acrylate, N,N-dimethylaminopropylacrylamide, acrylonitrile, methyl vinyl ketone, ethyl vinyl ketone, propyl vinyl ketone, vinyl acetate, methyl vinyl ether, ethyl vinyl ether, propyl vinyl ether, methyl methacrylate, ethyl methacrylate, propyl methacrylate, 2-hydroxyethyl methacrylate, 2-hydroxypropyl methacrylate, N,N-dimethylaminoethyl methacrylate, methacrylamide, N-isopropylacrylamide, N,N-dimethylaminopropylmethacrylamide, N,N-dimethylacrylamide, and N,N-diethylacrylamide.

The copolymer which is used in the present invention contains a divalent moiety of a vinylhydroxamic acid compound or a salt thereof (A) as an essential monomer component; and, preferably, further contains at least a divalent moiety (meth)acrylic acid or a salt thereof (B); and a divalent moiety of (meth)acrylamide (C).

The settling aid formed of the water-soluble polymer contains the aforementioned copolymer, serving as an effective component, preferably in an amount of at least 20 mass %, more preferably at least 25 mass %.

In the aforementioned copolymer, the ratio of the vinylhydroxamic acid compound or a salt thereof serving as monomer component (A) to the total monomer component is preferably at least 5 mol %, more preferably 10–30 mol %. When the amount of monomer component (A) is small, flocculation effect of red mud (residue) decreases, leading to an unsatisfactory sedimentation rate. When the monomer component (C) is included, the ratio is preferably at least 5 mol % in the copolymer, more preferably 10–30 mol %.

The settling aid formed of water-soluble polymer is added to the red mud-containing extract in an amount of preferably 0.003–0.05 mass % on the basis of red mud, as reduced to the total mass of monomer components (A), (B), (C), and (D), more preferably 0.007–0.04 mass %.

The water-soluble polymer has an average molecular weight of at least 2,000, preferably at least 10,000. When the average molecular weight is less than 2,000, flocculation effect of red mud (residue) decreases, leading to a poor sedimentation rate.

According to the method of the present invention, the residue can be separated rapidly merely through addition of the aforementioned water-soluble polymer to red mud without use of an additional settling aid such as slaked lime or starch in combination.

(4) Method for Separating Red Mud

Upon effecting the separation method of the present invention, an alumina ore serving as raw material is milled by means of a milling apparatus such as a ball mill under mixing with an alkaline solution, to thereby control the particle size to 12 mesh or less. The thus-milled matter is transferred to an extraction unit for recovering the alumina component. As the extraction unit, a sealable tubular reactor or vessel reactor is typically employed.

The extraction temperature and time cannot be predetermined absolutely, since they vary in accordance with the particle size of the milled bauxite, the type and concentration of the alkaline solution, etc., and extraction conditions, including apparatus conditions, may be predetermined such that alumina can be recovered economically. Typically, the extraction temperature is 110° C. to 160° C., preferably 115° C. to 150° C., and the extraction time is five hours or shorter, preferably some minutes to two hours. When a sodium aluminate solution is used as the alkaline solution, the sodium concentration, alumina concentration, and the amount of alkaline solution to be used are predetermined such that the concentration ratio of alumina ($Al_2O_3$)/soda (NaOH) (by mass) in the liquid after extraction is controlled to 0.7 to 1.0.

After completion of extraction, the slurry containing bauxite residue (red mud) is cooled to about 100° C. under atmospheric pressure, and immediately transferred to a solid-liquid separation unit, where the settling aid of the present invention formed of the aforementioned water-soluble polymer is added under stirring. After the mixture has been mixed in a homogeneous state, the extract (sodium aluminate solution) is separated from the extraction residue by means of the separation unit. A thickener equipped with a mud-collector is customarily employed as the solid-liquid separation unit.

Although the mechanism by which the aforementioned water-soluble polymer works well as the settling aid in separation of the extraction residue generated from a goethite-containing alumina ore has not been completely elucidated, a conceivable reason is that the presence of hydroxamic acid compound as a constitutional unit adds a chemical capture action to the physical capture action which polymer flocculants intrinsically possess, to thereby promote flocculation reaction with an ionic substance present on the residue.

Conventional separation of red mud generated during extraction of alumina from a goethite-containing alumina ore requires special operation, deteriorating cost performance. In contrast, according to the method of the present invention, red mud can be separated rapidly by simple operation. Accordingly, the method of the present invention is excellent in separation characteristics and economically advantageous, thereby providing high industrial value.

Best Modes for Carrying Out the Invention

The method of the present invention for separating red mud will next be described in detail by way of Examples and Comparative Examples, which should not be construed as limiting the invention thereto.

Bauxite

The alumina ores (bauxite) which were used as raw material of the below described Examples are bauxite containing goethite as an iron component (produced in Indonesia) and bauxite containing hematite as an iron component (produced in Australia). These bauxite samples were analyzed in accordance with JIS M8361-1968, and Table 1 shows the results. The method of analyzing bauxite in accordance with JIS M8361-1968 will next be described briefly.

Method of Quantitating Silicon Dioxide

Mixed acid is added to a bauxite sample, and the resultant mixture is heated for decomposition, followed by evaporation and then cooling. Warm water is added to the mixture so as to dissolve soluble salts. Undissolved matter is separated through filtration (the filtrate will be used for quantitating alumina, ferric oxide, and titanium oxide). Hydrofluoric acid is added to the undissolved matter, to thereby volatile the entirety of silicon dioxide. The total amount of silicon dioxide was determined on the basis of the weight loss caused by volatalization.

Method of Quantitating Ferric Oxide

To the solution from which the entire silicon dioxide component has been removed, hydrochloric acid is added. The mixture is heated to boiling, and then, a stannous chloride solution is added to the mixture, to thereby cause reduction. A mercuric chloride solution and a manganese sulfate solution are added to the mixture. The resultant mixture is subjected to titration by use of a potassium permanganese standard solution, to thereby quantitate ferric oxide.

Method of Quantitating Titanium Oxide

To the solution from which the entire silicon dioxide component has been removed, phosphoric acid is added. Aqueous hydrogen peroxide is added to the resultant solution for inducing coloration. Absorbance of the colored solution is measured, to thereby quantitate titanium oxide.

Method of Quantitating Alumina

To the solution from which the entire silicon dioxide component has been removed, ammonium chloride and nitric acid are added. The resultant mixture is neutralized by use of aqueous ammonia, to thereby form precipitates. The precipitates are separated through filtration and weighed. The weights of separately quantitated ferric oxide and titanium oxide are subtracted from the total weight of the precipitates, to thereby quantitate alumina.

Method of Quantitating Sodium Oxide

To the solution from which the entire silicon dioxide component has been removed, phosphoric acid is added. Aqueous hydrogen peroxide is added to the resultant solution for inducing coloration. Absorbance of the colored solution is measured, to thereby quantitate sodium oxide.

The crystal morphology of goethite and hematite contained in raw bauxite samples were identified through the X-ray diffraction analysis under the below-shown conditions. The results indicate that the iron component of the bauxite sample produced in Indonesia assumes goethite (70%), and that of the bauxite sample produced in Australia assumes hematite (90%).

X-ray diffraction analyzer: Model RAD-2RV (product of Rigaku Denki)

| Measurement conditions: | |
|---|---|
| X-ray tube: | Cu |
| Acceleration voltage: | 40 kV |
| Acceleration current: | 30 mA |
| Scan speed: | 1°/min |
| Light-receptor slit: | 1° |

TABLE 1

Analysis results of bauxite samples

| Origin of bauxite production | | | Indonesia | Australia |
|---|---|---|---|---|
| Composition | Crystal water | % | 28.3 | 27.7 |
| | $Al_2O_3$ | % | 52.1 | 49.8 |
| | $Fe_2O_3$ | % | 14.7 | 16.0 |
| | $TiO_2$ | % | 1.3 | 2.8 |
| | $SiO_2$ | % | 3.6 | 3.7 |
| Alumina | Gibbsite | % | 46.5 | 44.8 |
| | Boehmite | % | 0.0 | 3.5 |
| Iron | G/H | %/% | 70/30 | 10/90 |

G/H: goethite/hematite

Extraction

Each of the aforementioned bauxite (alumina source) samples was subjected to extraction under the following conditions: alumina component extraction temperature and extraction time of 140° C.-60 minutes and 120° C.-15 minutes, and in the following manner.

Each bauxite sample was milled into powder having a particle size of 150 μm or less. The thus-powdered bauxite was added to a sodium aluminate solution (1 L) containing NaOH (160 g/L) and $Al_2O_3$ (76 g/L) in required amounts such that the ratio $Al_2O_3$/NaOH (by mass) is controlled to 0.88 after completion of extraction, and the mixture was mixed, to thereby yield a dispersion. The dispersion was transferred into a hollow cylindrical pressure-resistant vessel (diameter: 60 mm, height: 200 mm), and the vessel was sealed. The sealed vessel was placed in an oil bath which had been heated to extraction temperature in advance, and inverted so as to effect stirring during the required extraction time, to thereby perform extraction of alumina. Immediately after completion of extraction, the pressure-resistant vessel was removed from the oil bath and rapidly cooled to 100° C. The mixture liquid was removed from the vessel.

A portion of the mixture liquid was sampled, and the composition of red mud and the solid concentration were determined. Component analysis of the red mud was performed in accordance with JIS M8361-1968, and Table 2 shows the results.

TABLE 2

Analysis results of bauxite residues

| Origin of bauxite production | | Indonesia | | Australia | |
|---|---|---|---|---|---|
| Extraction temp. | ° C. | 120 | 140 | 120 | 140 |
| Extraction time | min | 15 | 60 | 15 | 60 |

TABLE 2-continued

Analysis results of bauxite residues

| Origin of bauxite production | | | Indonesia | | Australia | |
|---|---|---|---|---|---|---|
| Composition | Crystal water | % | 14.7 | 13.3 | 10.6 | 6.5 |
| | $Al_2O_3$ | % | 22.0 | 13.4 | 23.9 | 15.6 |
| | $Fe_2O_3$ | % | 49.7 | 49.3 | 48.9 | 57.7 |
| | $TiO_2$ | % | 6.0 | 4.3 | 8.7 | 10.4 |
| | $SiO_2$ | % | 7.1 | 12.0 | 7.2 | 8.3 |
| | $Na_2O$ | % | 0.6 | 6.9 | 0.4 | 1.5 |
| Solid concentration of mixture liquid | | g/L | 48 | 38 | 44 | 36 |

Evaluation of Sedimentation Characteristics

The mixture liquid yielded through the aforementioned treatment was transferred into a heat-resistant glass-made sedimentation tube (volume 250 mL, inner diameter: 30 mm, height: 250 mm) and maintained in a thermostat bath controlled at 98° C. To a sedimentation tube containing the mixture liquid, any of required settling aids was added in accordance with the conditions of the Examples and Comparative Examples, and the contents were agitated to be homogeneous under the same conditions. The height of the sedimentation interface was measured every minute. The height of the mixture liquid in the sedimentation tube was considered as 100% the height of the sedimentation interface at the initial of sedimentation, and percent height of the interface between the solid matter and liquid was measured.

EXAMPLES 1 TO 4

Each sample of bauxite produced in Indonesia was subjected to extraction under the conditions of 140° C.-60 minutes (Examples 1 and 2) and 120° C.-15 minutes (Examples 3 and 4), to thereby yield a residue (red mud).

Examples 1 and 3 employed a polymer flocculent (HX-200, product of CYTEC INDUSTRIES INC.) (recurring unit proportions (mol %):Na acrylate:acrylamide:Na vinyloxamate=71 16:13, solid concentration: 29%, average molecular weight 2,000 or more). Examples 2 and 4 employed a polymer flocculent (HX-400, product of CYTEC INDUSTRIES INC.) (recurring units proportions (mol %): Na acrylate: acrylamide:Na vinyloxamate= 65:16:20, solid concentration: 30%, average molecular weight 2,000 or more). Each flocculent was added in an amount of 100 ppm based on the solid mass of the residue, and the sedimentation characteristics were determined in the aforementioned manner. Table 3 shows the results.

The unit compositional proportions of the polymer flocculent were determined by means of a magnetic resonance analyzer (AMX-400, product of Bruker), and the molecular weight was determined by means of a gel permeation chromatographic analyzer (CLASSLC-10, product of Shimadzu) (column: Shodex OHpakSB-806MHQ, standard: pullulan).

COMPARATIVE EXAMPLES 1 TO 3

In Comparative Example 1, the procedure of Example 1 was repeated, except that poly(sodium acrylate) (average molecular weight: 10,000,000 or more) (Panakayaku CSG-K, product of Nippon Kayaku Co., Ltd.) was used as a polymer flocculant in an amount of 0.01% based on the solid mass of the residue, and sedimentation characteristics were determined. In Comparative Example 2, the procedure of Example 1 was repeated, except that slaked lime (0.08%) and starch (1.0%) (on based on the solid mass of the residue) were used instead of the polymer flocculant, and sedimentation characteristics were determined.

In Comparative Example 3, the procedure of Comparative Example 1 was repeated, except that extraction conditions were changed to 120° C.-15 minutes, and sedimentation characteristics were determined.

Table 3 shows the results.

COMPARATIVE EXAMPLES 4 TO 7

In Comparative Examples 4, 5, 6, and 7, the procedure of Examples 1 and 4, and Comparative Examples 1 and 3 were repeated, respectively, except that the ore was changed to bauxite produced in Australia, and sedimentation characteristics were determined in a similar manner. Table 3 shows the results.

TABLE 3

Extraction conditions and sedimentation characteristics of residue-containing liquid

| No. | Ex. 1 | Ex. 2 | Ex. 3 | Ex. 4 |
|---|---|---|---|---|
| Bauxite | Indonesia | | | |
| Extraction temp. | 140° C. | 140° C. | 120° C. | 120° C. |
| Extraction Time | 60 min | 60 min | 15 min | 15 min |
| Polymer flocculant | HX-200 | HX-400 | HX-200 | HX-400 |
| Amount of polymer | 100 ppm | 100 ppm | 100 ppm | 100 ppm |
| Amount of starch | 0 | 0 | 0 | 0 |
| Amount of slaked lime | 0 | 0 | 0 | 0 |
| Sedimentation Time Min | interface height % | interface height % | interface height % | interface height % |
| 0 | 100 | 100 | 100 | 100 |
| 5 | 34 | 35 | 35 | 36 |
| 10 | 25 | 26 | 27 | 28 |
| 20 | 22 | 24 | 23 | 25 |
| 30 | 21 | 23 | 21 | 23 |
| 60 | 20 | 21 | 20 | 22 |

| No. | Comp. Ex. 1 | Comp. Ex. 2 | Comp. Ex. 3 |
|---|---|---|---|
| Bauxite | Indonesia | | |
| Extraction temp. | 140° C. | 140° C. | 120° C. |
| Extraction Time | 60 min | 60 min | 15 min |
| Polymer flocculant | Poly(acrylic acid) | None | Poly(acrylic acid) |
| Amount of polymer | 100 ppm | 0 | 100 ppm |
| Amount of starch | 0 | 1.0% | 0 |
| Amount of slaked lime | 0 | 0.08% | 0 |
| Sedimentation Time Min | interface height % | Interface height % | interface height % |
| 0 | 100 | 100 | 100 |
| 5 | 95 | 75 | 94 |
| 10 | 88 | 55 | 87 |
| 20 | 70 | 40 | 72 |
| 30 | 55 | 30 | 59 |
| 60 | 50 | 29 | 50 |

TABLE 3-continued

Extraction conditions and sedimentation characteristics of residue-containing liquid

| No. | Comp. Ex. 4 | Comp. Ex. 5 | Comp. Ex. 6 | Comp. Ex. 7 |
|---|---|---|---|---|
| Bauxite | | Australia | | |
| Extraction temp. | 140° C. | 120° C. | 140° C. | 120° C. |
| Extraction Time | 60 min | 15 min | 60 min | 15 min |
| Polymer flocculant | HX-200 | HX-400 | Poly-(acrylic acid) | Poly (acrylic acid) |
| Amount of polymer | 100 ppm | 100 ppm | 100 ppm | 100 ppm |
| Amount of starch | 0 | 0 | 0 | 0 |
| Amount of slaked lime | 0 | 0 | 0 | 0 |
| Sedimentation Time Min | interface height % | interface height % | interface height % | interface height % |
| 0 | 100 | 100 | 100 | 100 |
| 5 | 95 | 94 | 35 | 37 |
| 10 | 89 | 88 | 25 | 27 |
| 20 | 75 | 74 | 22 | 23 |
| 30 | 60 | 62 | 21 | 22 |
| 60 | 49 | 48 | 19 | 20 |

INDUSTRIAL APPLICABILITY

As is clear from Table 3, in separation of the extraction residue generated from bauxite produced in Australia and containing hematite as an iron component, use of poly (acrylic acid), which has been conventionally employed as a flocculent, attains excellent sedimentation characteristics (Comparative Examples 6 and 7). However, sedimentation characteristics are considerably deteriorated when poly (acrylic acid) is employed as a flocculant in separation of the extraction residue generated from bauxite produced in Indonesia and containing goethite as an iron component (Comparative Examples 1 and 3). When starch and slaked lime are used as flocculants, sedimentation characteristics are insufficient (Comparative Example 2). In contrast, the separation method of the present invention attains excellent sedimentation characteristics (Examples 1 to 4).

When the separation method of the present invention is applied to the extraction residue generated from bauxite produced in Australia, sedimentation characteristics are poor (Comparative Examples 4 and 5). Thus, the method of the present invention specifically exerts an effect directed to bauxite containing goethite as an iron component.

What is claimed is:

1. A method for separating goethite-containing red mud contained in a sodium aluminate solution which is obtained by heating an alumina ore containing goethite as an iron component with an alkaline solution at 110–1600C, which method comprises adding a settling aid formed of a water-soluble polymer including, as an effective component, a copolymer having an average molecular weight of at least 2,000 and containing, as monomer components, a divalent moiety of a vinylhydroxamic acid compound or a salt thereof (A); a divalent moiety (meth) acrylic acid or a salt thereof (B); and a divalent moiety of (meth) acrylamide (C), to thereby settle the red mud and separate the settled red mud wherein the settling aid formed of the water-soluble polymer contains, in a amount of at least 20 mass %, the copolymer containing, as a monomer component, a divalent moiety formed of a vinylhydroxamic acid compound or salt thereof (A), and wherein the ratio of the vinylhydroxamic acid compound or salt thereof serving as monomer component (A) to the total monomer component is at least 5 mole.

2. A method of separating goethite-containing red mud as described in claim 1, wherein the alumina ore comprises the iron component containing goethite in an amount of at least 60 mass %, and the alumina component containing gibbsite in an amount of at least 70% is used as a raw material.

3. A method for separating goethite-containing red mud as described in claim 1, wherein the water-soluble polymer is added in an amount of 0.003–0.05 mass % on the basis of red mud, as reduced to the total mass of monomer components (A), (B) and (C).

* * * * *